Figure 3:
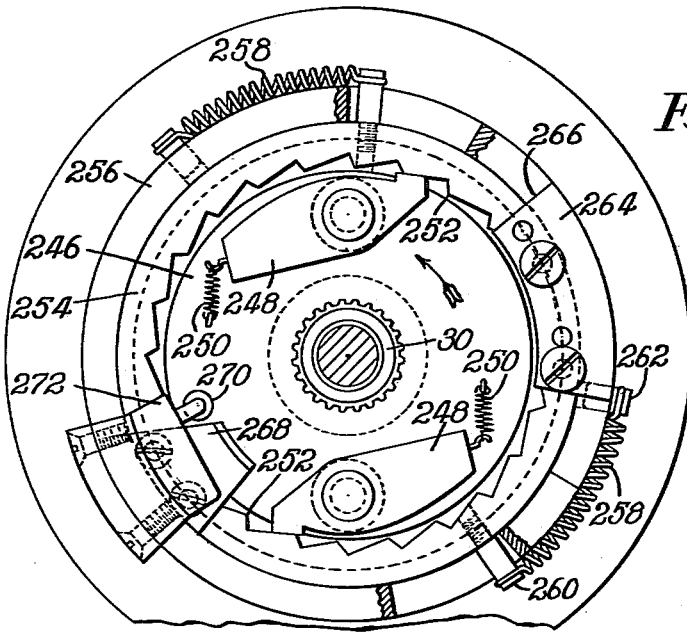

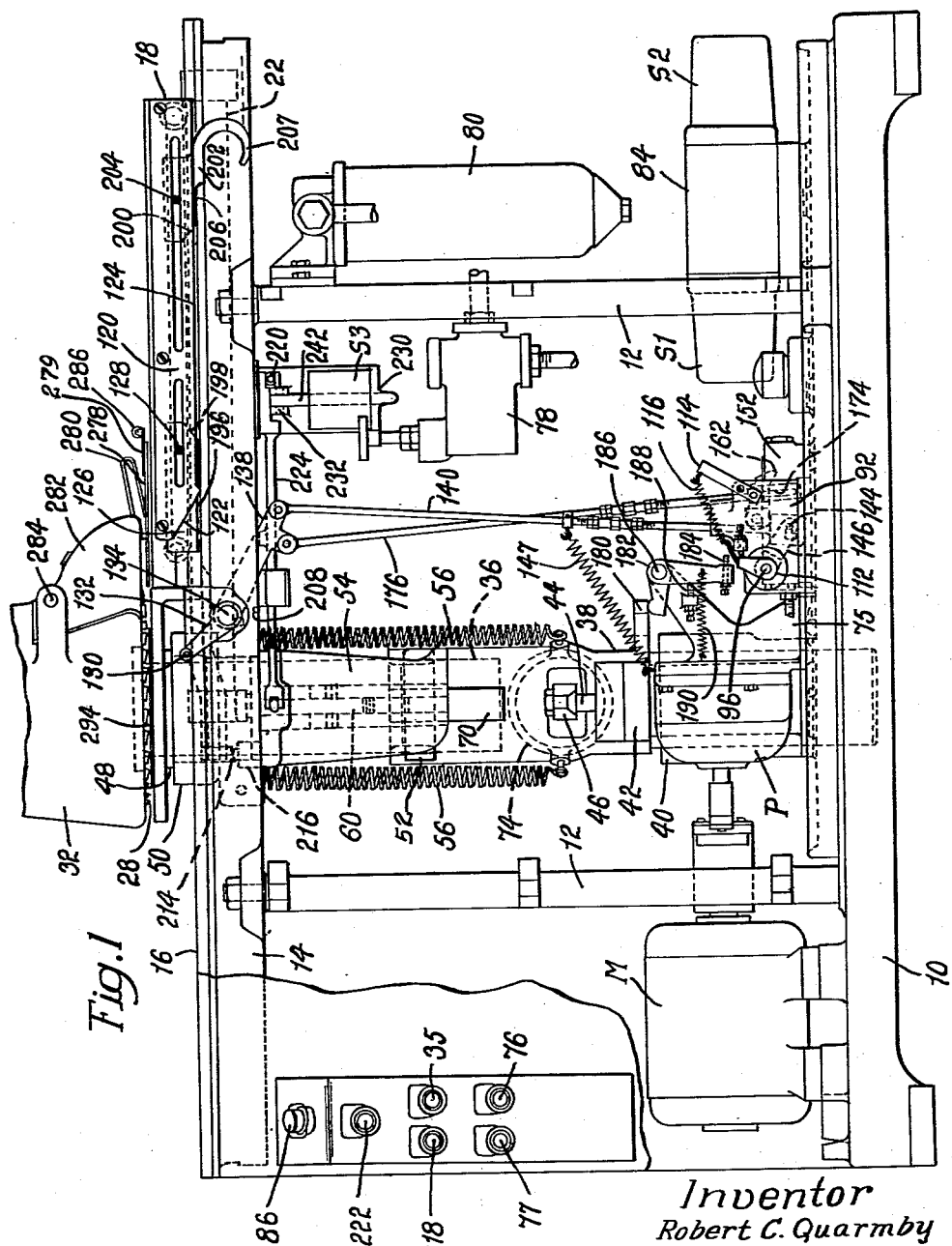

Nov. 6, 1962 R. C. QUARMBY 3,061,853
MACHINE FOR REDUCING AND ROUGHING SHOE PARTS
Filed Nov. 1, 1960 8 Sheets-Sheet 4
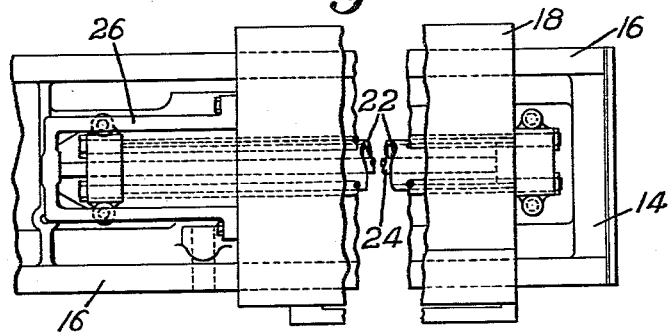
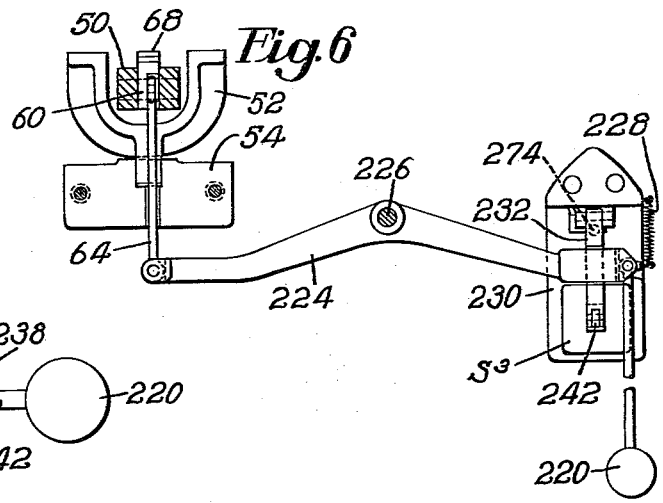
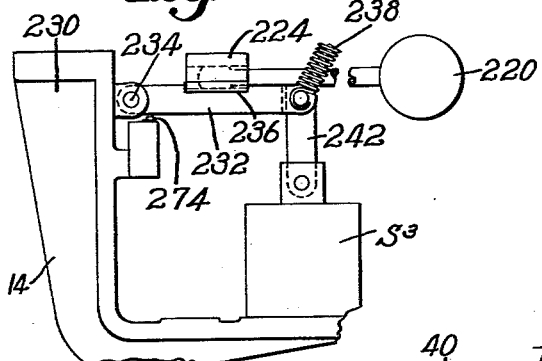
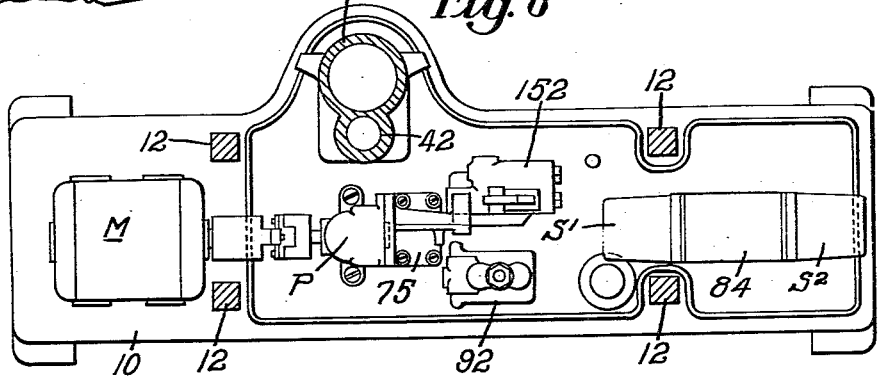

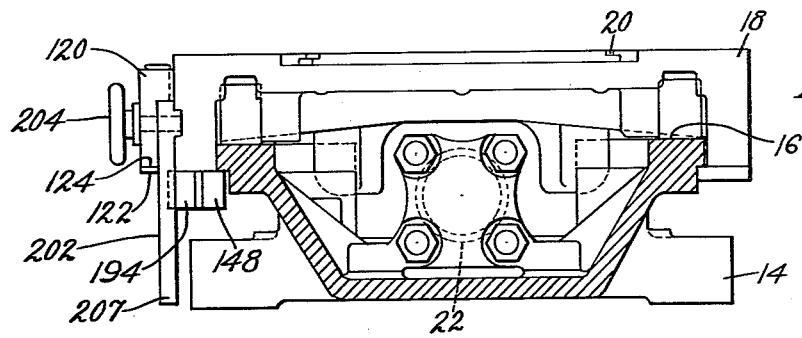
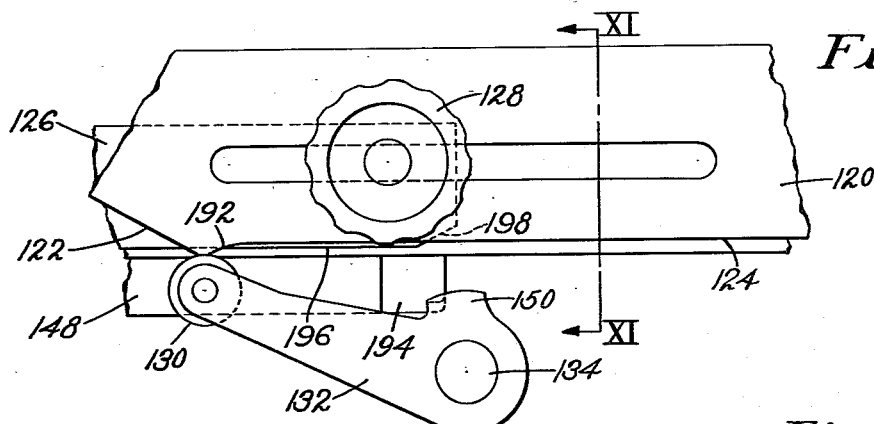
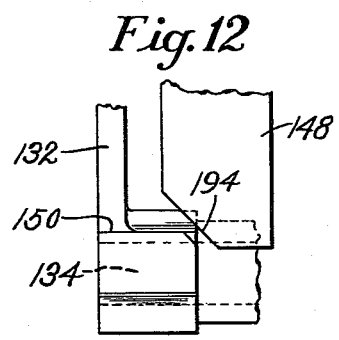
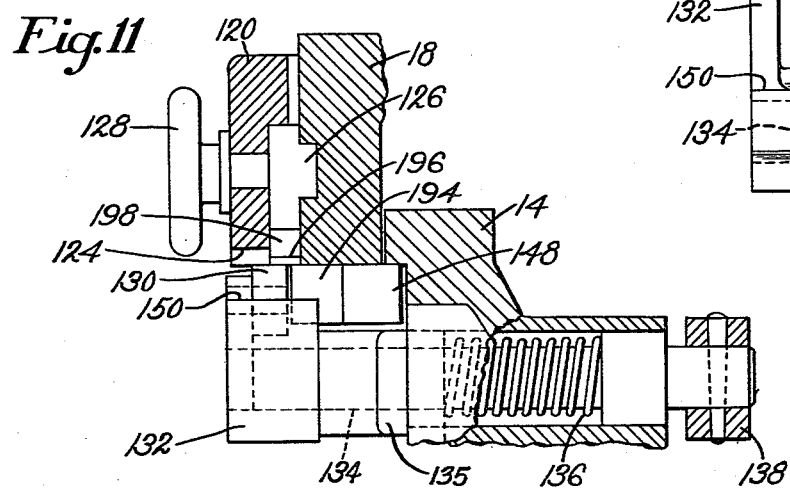

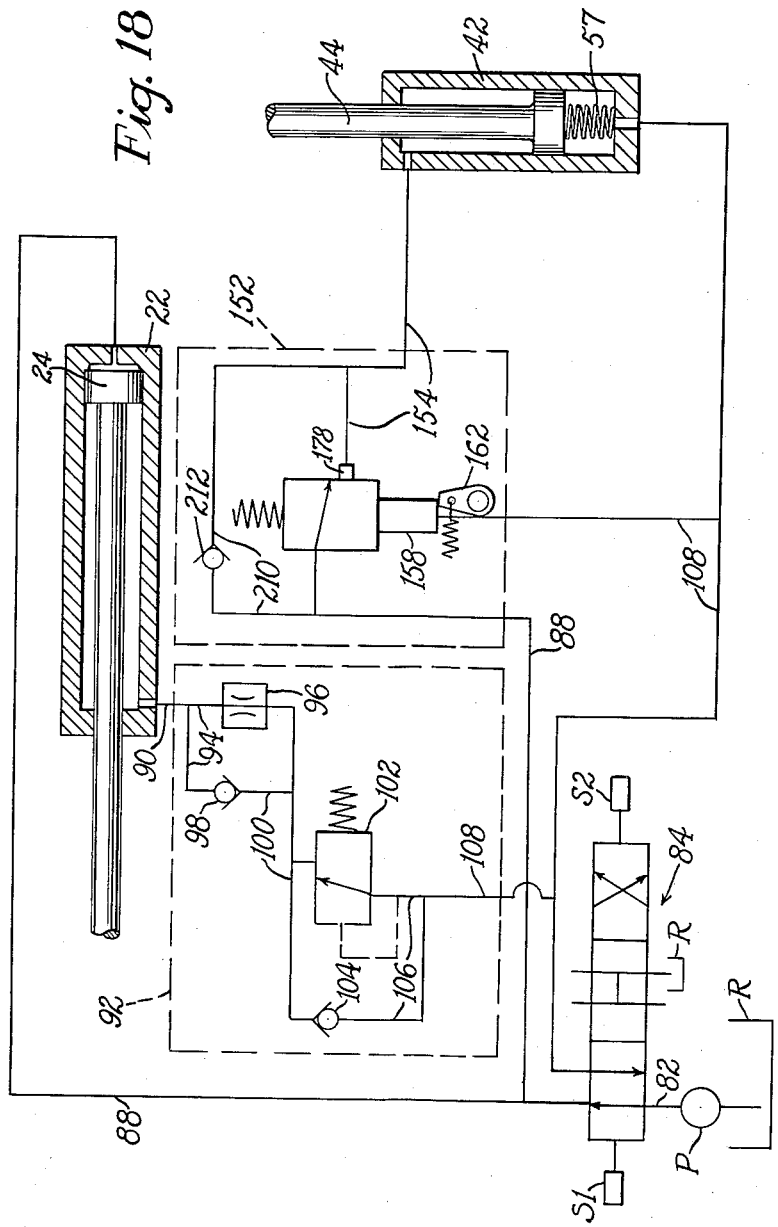

United States Patent Office 3,061,853
Patented Nov. 6, 1962

3,061,853
MACHINES FOR REDUCING AND ROUGHING SHOE PARTS
Robert Charles Quarmby, Leicester, England, assignor to United Shoe Machinery Corporation, Boston, Mass., a corporation of New Jersey
Filed Nov. 1, 1960, Ser. No. 66,560
Claims priority, application Great Britain Nov. 13, 1959
16 Claims. (Cl. 12—17)

This invention relates to machines for operating upon shoe parts such as shoe soles and, more particularly, is concerned with improvements in a machine of the type disclosed in United States Letters Patent No. 2,958,879, issued November 8, 1960, to C. H. James and R. C. Quarmby.

In the operation of the above-noted James et al. machine, a sole is placed in a matrix carried by a work support which is mounted for movement across the rim of a rotary cutter, the matrix being so shaped as to raise, into the field of action of the cutter, certain portions of the sole above the level of the rest of the sole. Thus, according to the type of matrix employed, any or all of various operations, such as heel breast flap forming, shank reducing, feather edging, and roughing, are performed upon the relatively raised portions of the sole.

Because of the thinness of a heel breast flap, its flexibility may permit it to become displaced in the matrix and hence damaged by the cutter. Similarly, upon performing a feather edging operation upon the toe portion of a sole and particularly when the sole is more pointed than usual, its toe end portion is subject to the same possibility of being damaged. However, thin heel and toe portions of a sole, when operated upon in a machine of this type, are not subject to damage if the feeding movement is slow enough and if the sole is not moved past the cutter, in engagement therewith, back to its starting position after it has been operated upon.

In view of the foregoing, an object of the invention is to provide for the presentation of a shoe part, such as a sole, to a cutter in a machine of the type referred to with a feeding movement of different speeds, one being a low speed appropriate for operating upon the end portions of the sole and another being a higher speed which is permissible for operating upon the remainder of the sole and is conducive to reducing the total time required for the operation.

To further the efficiency of the machine, another object of the invention is to minimize the period of each operating cycle of the machine by causing its work support to have an advancing movement, to bring the matrix and sole therein up to the cutter, above the highest permissible speed for operating upon the sole, and similarly, to cause the work support to be returned to its starting position, after the sole has been operated upon, also at a high speed.

A further object of the invention is to avoid a second presentation of the sole to the cutter, as during the return movement of the work support, by moving the cutterhead into an operative position, in synchronism with the cyclical movement of the work support, just before the work piece is brought to the field of action of the cutter and later moving the cutter out of its operative position after the operation upon the sole will have been completed. Thus, during each return movement of the work support, the sole being out of contact with the cutter, no damage can possibly be inflicted upon the sole by the cutter.

The above and other objects of the invention are attained in the illustrative machine by the provision of its various novel features which will now be disclosed in detail in the following specification and will be set forth in the appended claims.

Figure 2:
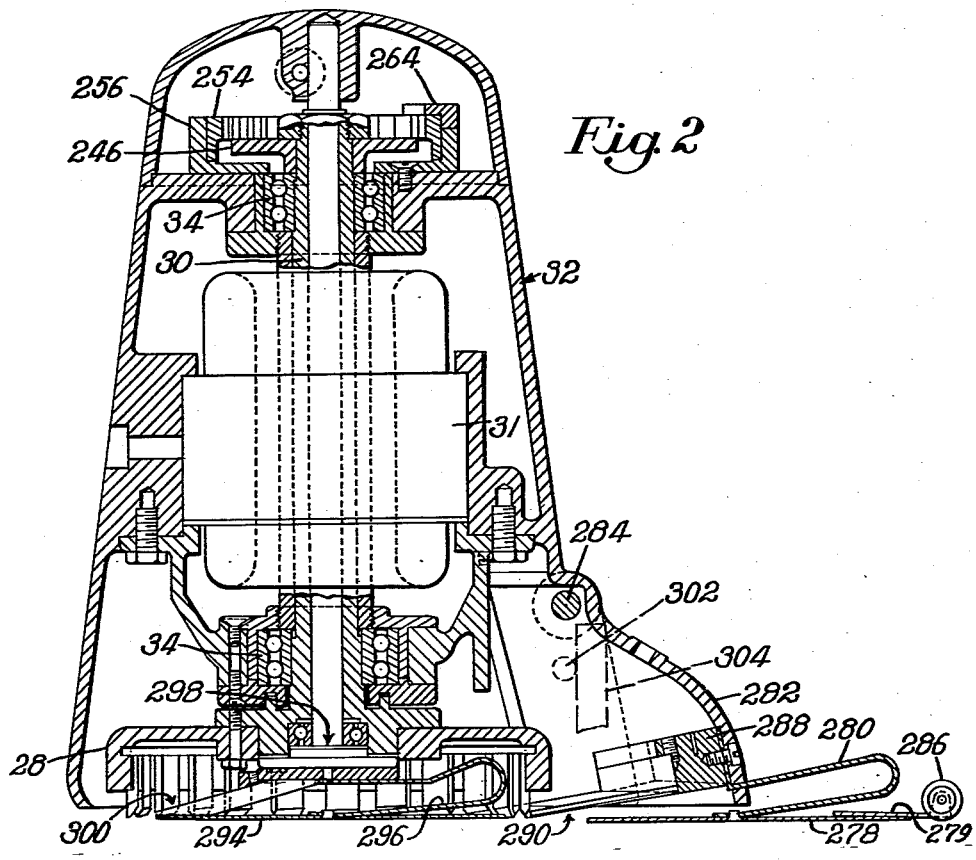
Figure 4:
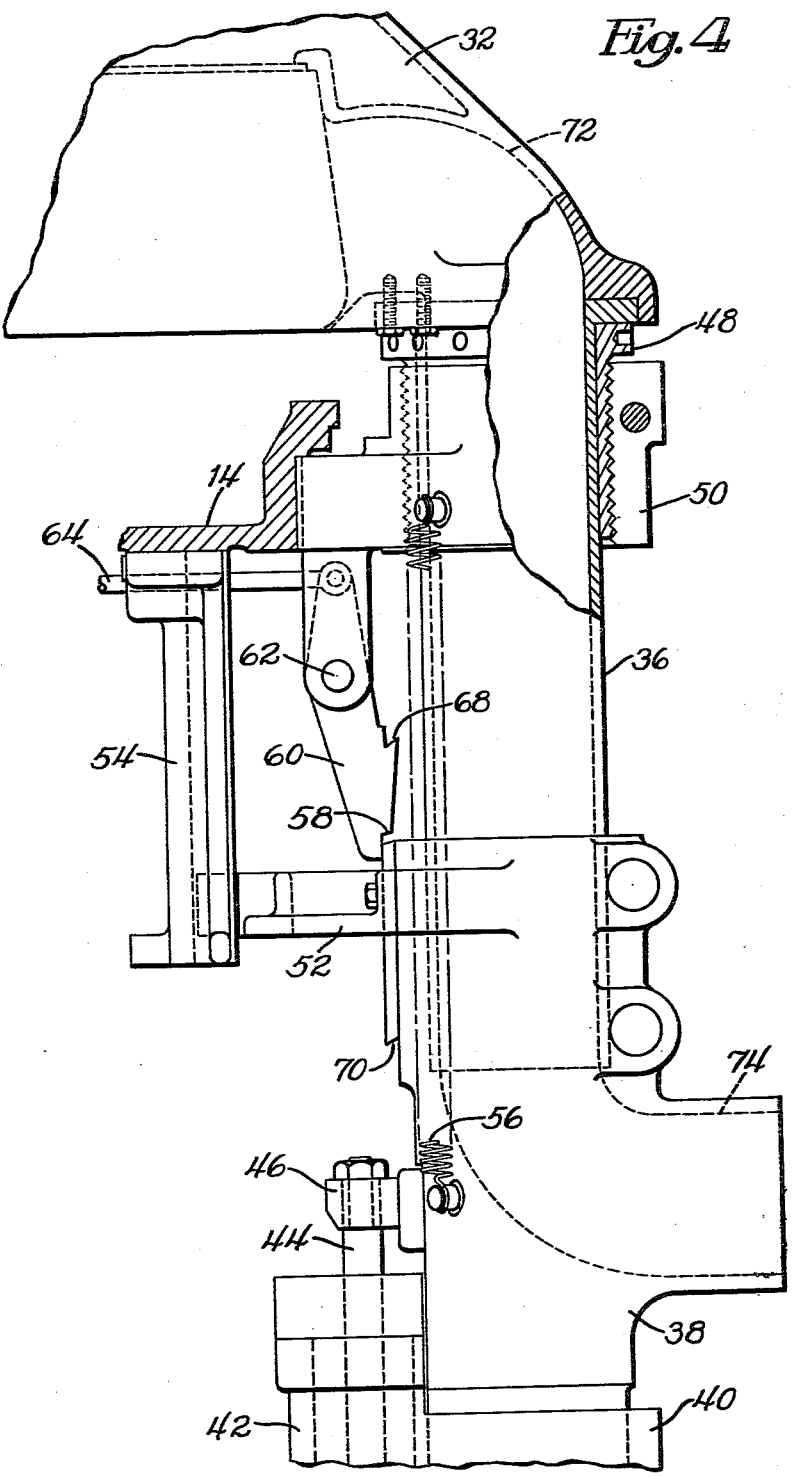
Figure 13:
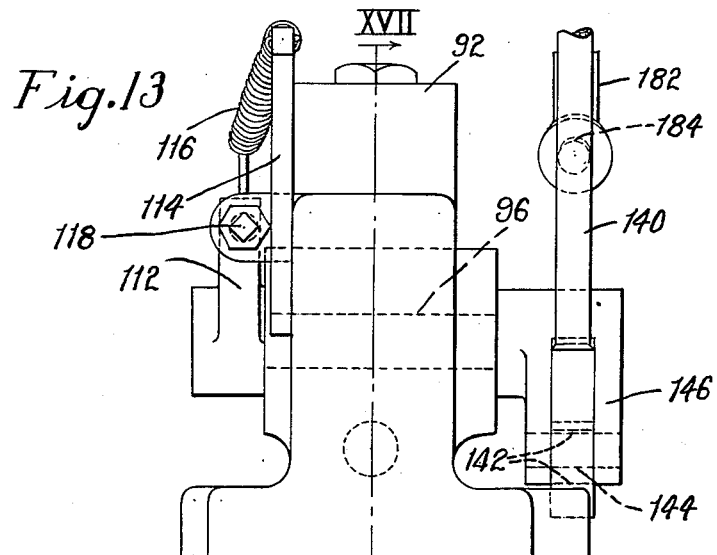
Figure 14:
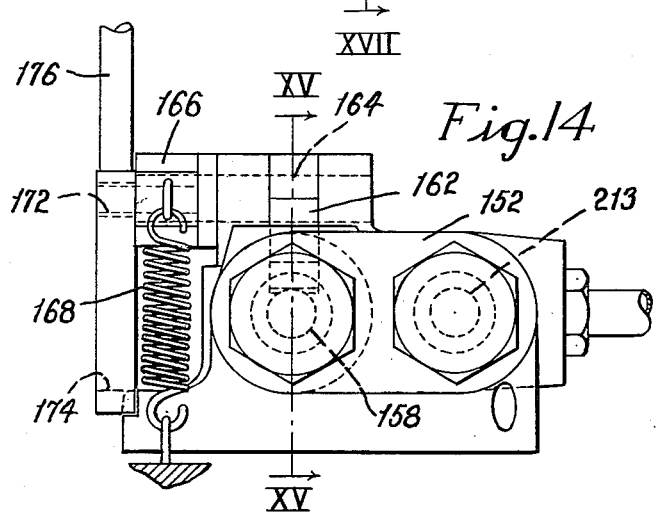
Figure 15:
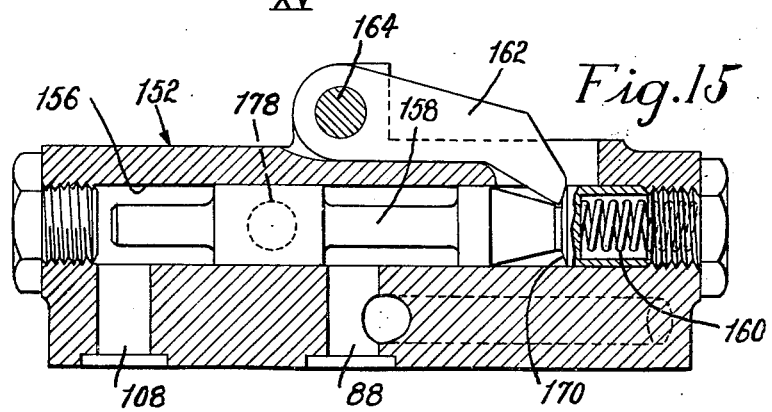
Figure 16:
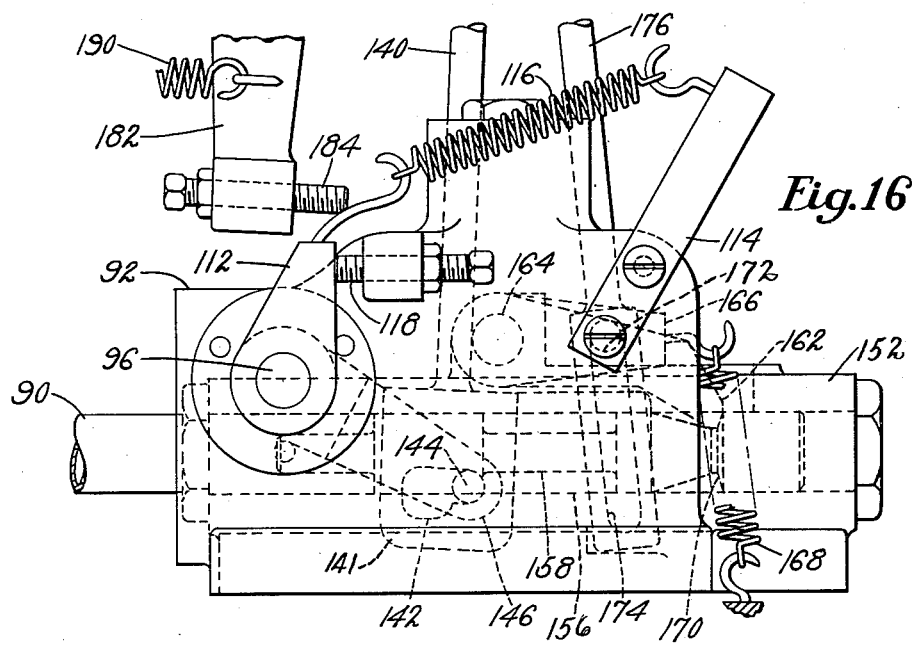
Figure 17:
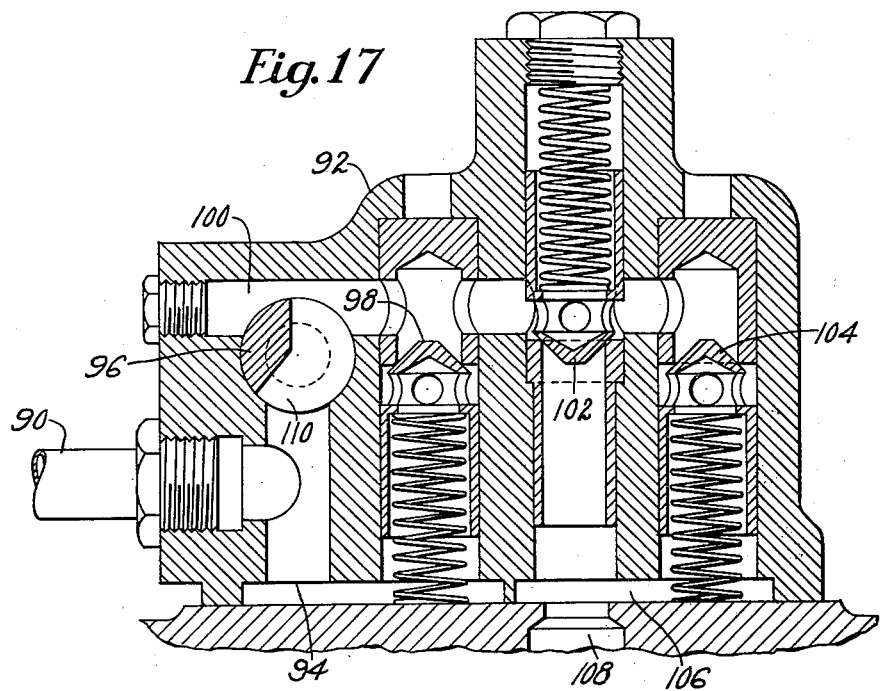

In the drawings,
FIG. 1 is a front elevation of an illustrative machine embodying the invention;
FIG. 2 is a sectional front elevation of the cutter head of the machine;
FIG. 3 is a plan view of mechanism at the top of the cutterhead for stopping rotation of the cutter;
FIG. 4 is a side elevation of the mounting for the cutterhead as viewed from the right;
FIG. 5 is a plan view of the work support and bed along which the support is movable to present a work piece thereon to the cutterhead;
FIG. 6 is a plan view of mechanism for controlling the cutterhead;
FIG. 7 is a side elevation of a locking mechanism shown in FIG. 6 as viewed from the left;
FIG. 8 is a plan view of the base of the machine and a part of its fluid system;
FIG. 9 is a side sectional elevation of the work support and bed of the machine as viewed from the right;
FIG. 10 is a front elevation of a part of the structure of FIG. 9;
FIG. 11 is a sectional side elevation of the structure of FIG. 10, the section being taken along the line XI—XI in FIG. 10;
FIG. 12 is a plan view of details of the structure shown in FIG. 11;
FIGS. 13 to 18, inclusive, illustrate parts of the fluid system of the machine, FIG. 13 being a side elevation of a valve and mechanism, as viewed from the right, for controlling the movement of the work support;
FIG. 14 being a side elevation of a valve and mechanism, as viewed from the right, for lowering the cutterhead;
FIG. 15 being a sectional front elevation of the structure of FIG. 14, the section being taken along the line XV—XV in FIG. 14;
FIG. 16 being a front elevation of the structure of FIGS. 13 and 14;
FIG. 17 being a sectional front elevation of the valve of FIG. 13, the section being taken along the line XVII—XVII in FIG. 13; and
FIG. 18 being a diagramatical showing of the entire fluid system, including fluid motors for raising and lowering the cutterhead and for imparting feeding and return movements to the work support.

The illustrated machine has a base 10 (FIG. 1) upon which are mounted four posts 12 for supporting a bed 14 which extends laterally of the machine. The bed has ways 16 thereon along which slides a work support 18 carrying, in a recess in its upper surface, a matrix 20 (FIG. 9) of the type disclosed in the above-mentioned James et al. patent for holding a shoe part to be operated upon. The work support 18 is driven through a feeding movement to the left, from its position as illustrated in FIG. 1, and an opposite return movement by a fluid motor comprising a cylinder 22 (FIGS. 1 and 5) which is fixed at each end thereof upon the bed 14 and a piston 24 (FIG. 5), the latter being carried by a U-shaped bracket 26 which is fixed upon the left-hand end of the work support 18.

By the feeding movement of the work support, a shoe part in the matrix 20 is presented to the teeth of a cutter 28 (FIG. 2) which is mounted upon the lower end of a hollow shaft 30 of a motor 31, the shaft being mounted for rotation within a cutterhead 32 upon a pair of ball bearings 34, 34. The power supply for the motor 31 is controlled by a switch 35 at the front of the machine.

The cutterhead 32 is mounted for vertical movement between an operative position, wherein the cutter 28 is at a level immediately above the matrix 20, and a retracted position some distance above its operative position. For this purpose, the cutterhead 32 is mounted upon the upper end of a hollow column 36 (FIG. 4), the lower portion of which is clamped in a post 38 mounted to slide vertically in a cylinder 40 which is fixed upon the base 10. The post 38 is operated to lower and raise the cutterhead 32 by a fluid motor which comprises a cylinder 42, integral with the cylinder 40, and a piston 44 which runs in the cylinder 42 and is fixed upon a lug 46 attached to the post 38. The column 36 is guided near its upper end within a bushing 48 which is threaded in a bearing member 50, the latter being fixed upon the rear of the bed 14. Downward movement of the cutterhead is adjustably limited by engagement of a flange on the column 36 with the bushing 48 and it is evident that by turning the bushing within the bearing member the operative position of the cutterhead can be varied.

The cutterhead 32 is prevented from swinging by a finger 52 which is fixed upon the post 38 and is received in a vertical groove formed in a guide 54 which is secured to the bed 14. A pair of springs 56, 56 stretched between the member 50 and the post 38 and another spring 57 (FIG. 18) between the piston 44 and the bottom of the cylinder 42 counterbalance the cutterhead and its mounting. A normal retracted position of the cutterhead is determined by the engagement of a shoulder 58 on a lever 60 with the upper end of the post 38. This lever is pivoted at 62 upon the member 50 and, by operator controlled mechanism including a link 64 pivoted to the upper end of the lever, may be swung away from the post to allow the cutterhead to rise to a higher retracted position in which the cutterhead is suspended by engagement of a hook 68 on the lever 60 with a shoulder 70 on the post. The higher retracted position of the cutterhead is used to facilitate servicing the cutter 28. To provide for the disposal of chips made by the cutter 28 a duct 72, formed in the cutterhead 32, is connected by the hollow column 36 with another duct 74 formed in the post 38 to which a waste extracting unit may be connected.

The above-mentioned motors for moving the cutterhead 32 and the work support 18 are parts of a fluid system for which fluid pressure is supplied by a pump P (FIGS. 1 and 8) which is mounted upon a bracket 75 fixed upon the base 10. The pump is driven by a motor M which is controlled by a starting switch 76 and a stopping switch 77 (FIG. 1). The output of the pump is delivered via a pressure regulator 78 and a filter 80 through a duct 82 to a four-way, self-centering valve 84. This valve is normally in its centered position wherein fluid drawn by the pump from a reservoir R is returned thereto.

With the work support 18 in its loading position at the right-hand end of the bed 14 (FIG. 1) and the cutterhead 32 raised into its normal retracted position, a cycle of operation of the machine is initiated by closing a switch 86 which causes a solenoid S1, at the left-hand end of the valve 84, to set the valve in a position, as illustrated in FIG. 18, wherein fluid pressure is delivered to the right-hand end of the cylinder 22 through piping 88 to cause a feed movement of the work support 18 to the left to be started. Exhaust fluid is ejected from the left-hand end of the cylinder 22 through a pipe 90 to a valve body 92 (FIG. 17) having therein a duct 94 which leads to one side of a normally open choke valve 96 and to a check valve 98. The discharge of fluid from the choke valve is carried to the reservoir R via a bore 100 in the valve body, radial openings in a check valve 102, another check valve 104, a duct 106 in the valve body and piping 108 which leads to the valve 84.

The choke valve 96 is rotatably mounted in the valve body 92 and is provided with a narrow segmental slot 110 which is perpendicular to the axis of the choke valve and provides a passage for the flow of fluid from the duct 94 into the bore 100. Upon the forward end of the choke valve there is fixed an arm 112 (FIGS. 16 and 13) carrying a hook between which and another hook at the upper end of a bar 114 fixed upon the body 92 there is stretched a spring 116. This spring biases the choke valve 96 toward its fully open position, as illustrated in FIG. 17, which is determined by the engagement of the arm 112 with a stop screw 118 which is threaded into the body 92. With the supply of fluid to the choke valve in its open position, the work support 18 advances toward the cutter at its maximum speed, of about 11″ per second, until the heel end of the sole in the matrix reaches the cutterhead. At this time, movement of the work support 18 is gradually reduced and then interrupted because of the closure of the choke valve 96, as will next be described.

Upon the forward side of the work support 18 (FIGS. 1 and 10) there is mounted a long slotted cam plate 120 having at its left-hand end a sloping shoulder 122 the lower end of which is disposed below a level cam surface 124 on the cam plate. Near the left-hand end of the work support there is provided another cam plate 126 which is adjustable lengthwise of the work support and is clamped to the cam plate 120 by a screw 128. Soon after a feeding movement of the work support 18 begins, the shoulder 122 on the cam plate 120 engages a roll 130 on an arm 132 which is fixed upon the forward end of a shaft 134. This shaft is mounted for rotative and axial movement in the bed 14 (FIG. 11) and is biased rearwardly by a spring 136 which is compressed between a bracket 135, which supports the shaft, and a shoulder on the shaft. Upon the rear end of the shaft 134 there is fixed an arm 138 to the end of which there is pivoted a link 140 (FIGS. 1 and 16), the lower end of which has a block 141 having an L-shaped slot 142 therein. This slot receives a pin 144 which is carried by a bifurcated arm 146 fixed upon the rear end of the choke valve 96; and a spring 147, stretched between the link 140 and the above-mentioned bracket 75, causes the pin 144 normally to be seated in the right-hand end of the slot 142.

During the initial feeding movement of the work support, the arm 132 is held in an outer position, wherein the roll 130 is forward of the cam plate 126 and in alignment with the cam plate 120, by a bar 148 (FIGS. 10, 11 and 12) which is fixed to the work support 18 and is adapted to engage the rearward side of a lug 150 on the arm 132. It will now be evident that when the shoulder 122 on the cam plate 120 is presented to the roll 130, the arms 132 and 138 will be swung counterclockwise, the link 140 will be lifted and the choke valve 96 will be closed, this event occurring when the lower end of the shoulder 122 lies directly over the roll 130, as illustrated in FIG. 10. At this time also, the heel end of the sole in the matrix will have been brought up to the cutterhead.

Just before the choke valve 96 is closed, a valve 152 (FIGS. 15 and 18), to which fluid is supplied by the piping 88, is opened to deliver fluid through a pipe 154 to the upper end of the cylinder 42, whereby the cutterhead 32 is lowered into its operative position. The valve 152 has a bore 156 containing a piston 158 which is biased to the left by a spring 160 but is normally held in its closed position by a latch 162. The latch is fixed upon a shaft 164 (FIGS. 14, 15 and 16) upon the forward end of which there is fixed an arm 166; and a spring 168, stretched between hooks on this arm and the base 10 yieldingly holds the latch in a recess 170 in the piston. A pin 172, carried by the arm 166, is received in a slot 174 formed in the lower end of a link 176, the upper end of which is pivoted to the above-mentioned arm 138. It will now be evident that, because of the slot 174 in the link 176, the latch 162 will not be operated to release the piston 158 and open the valve 152 until just before the lower end of the shoulder 122 on the cam plate 120 is presented to the roll 130. Displacement of the piston 158 to the left causes a port 178 (FIG. 15) in the valve 152 to be opened whereby fluid is permitted to pass through the pipe 154 (FIG. 18) into the upper end of the cylinder 42. Thus, lowering movement of the cutterhead 32 into its operative position is begun and such movement continues until it is arrested by the engagement of the cutterhead with the bushing 48 which will have been adjusted to determine the desired operative position of the cutter 28.

The terminal movement of the cutterhead into its operative position is utilized to reset the choke valve 96 into a partially open position whereby the feed movement of the work support 18 is resumed at a slow speed. Before the cutterhead reaches its operative position, a finger 180 (FIGS. 1 and 16) on the post 38 swings an arm of a bell crank 182 counterclockwise so as to cause a screw 184, threaded in the lower end of the bell crank, to contact the block 141 and thereby shift the link 140 to the right, whereby the pin 144 is permitted to fall into the lower portion of the slot 142 under the impulse of the spring 116. Thus, the choke valve is automatically opened. The bell crank 182 is pivoted at 186 upon the bracket 75 into which is threaded a stop screw 188 for determining the normal position of the bell crank. A spring 190 stretched between the bracket 75 and the bell crank normally holds the latter against the stop screw 188.

With resumption of the feed movement of the work support 18, the lower extremity of the shoulder 122 (FIG. 10) on the cam plate 120 is moved off the roll 130 and a rising slope 192 on the cam plate permits the roll 130 to rise whereby the choke valve 96 is opened more. At this time, a cam face 194 at the right-hand end of the bar 148 passes off the lug 150 and the arm 132 is permitted to move rearwardly so that the roll 130 is in a position to engage either the cam surface 196 or the cam surface 124. The normal rearward position of the roll 130 is determined by the engagement of the arm 132 with the forward portion of the bracket 135 (FIG. 11). The rise of the roll 130 is now limited by a level cam surface 196 on the plate 126 and the valve 96 is set to provide the above-mentioned slow feeding speed of the work support of about 2" per second, a speed which is appropriate for the breast flap forming operation.

When the breast line area of the sole reaches the cutter 28, a sloping shoulder 198 on the cam plate 126 moves away from the roll 130 allowing it to rise further and into engagement with the level cam surface 124 on the cam plate 120, whereupon the choke valve 96 is opened still wider and a relatively high feeding speed of about 5" per second of the work support 18 is maintained while the shank and forepart portions of the sole are operated upon.

Just before the toe end of the sole moves under the cutter, the feeding speed of the work support 18 is reduced to the lower speed of about 2" per second upon the presentation of a sloping cam surface 200 (FIG. 1) on a cam plate 202 to the above-mentioned roll 130. To permit changes in the timing of this speed change, the cam plate 202 is mounted for adjustment lengthwise of the work support 18 and is clamped in position by a screw 204 which passes through a slot in the cam plate 120. As a cam surface 206 on the plate 202, at the level of the cam surface 196 on the cam plate 126, is presented to the roll 130, the lower speed of the work support is resumed and maintained while the toe end of the sole is moved past the cutter 28. Then, a finger 207 on the cam plate 202 operates a microswitch 208 which is fixed upon the bed 14 and causes a solenoid S2 at the right-hand end of the valve 84 to be energized. The valve is thus shifted to the left to a position wherein fluid pressure is directed to the piping 108 (FIG. 18) and discharge of fluid from the piping 88 into the reservoir is permitted.

The first response to this shift of the valve 84 is the beginning of a rising movement of the cutterhead 32 because fluid pressure is immediately delivered through the piping 108 to the bottom of the cylinder 42. Fluid is discharged from the upper end of the cylinder 42 through the pipe 154 and a duct 210 which leads, around the valve 152, to the piping 88. A check valve 212 in the duct 210 permits the free flow of fluid in the direction indicated, but prevents the delivery of fluid pressure through the duct toward the cylinder 42. Upon the arrival of the cutterhead in its normal retracted position, determined by the engagement of the post 38 (FIG. 4) with the shoulder 58 on the lever 60, and in response to an increase of pressure in the fluid system caused by the stopping of the piston 44, the valve 102 (FIGS. 17 and 18) is opened. The delayed opening of the valve 102 is accomplished by providing a spring in said valve which has a spring rate of sufficient magnitude to ensure that the motion of the piston 44 is arrested prior to the opening of the valve. Fluid discharged from the valve 102 is delivered, via the bore 100, the check valve 98, the bore 94, and pipe 90, to the left-hand end of the cylinder 22, whereby a rapid return stroke is imparted to the work support 18 because the choke valve 96 is now bypassed by the fluid connections including the check valve 98 which permits the free flow of fluid to the cylinder 22. Near the end of the return movement of the work support there will be presented to the roll 130 on the arm 132, in succession, the cam surface 196 and cam shoulder 122, the arm 132 being shifted outwardly to hold the roll 130 away from the cam 126 while it is engaged by the cam shoulder 122. Thus, the arms 132, 138 are permitted to swing clockwise into their original positions, whereby the choke valve 96 is returned to its fully open position and the latch 162 is released and biased against the piston 158 in the valve 152. The valve 152 is now latched in its closed state because the piston 158 will have been returned to its closed position by fluid pressure applied to its left-hand end (FIG. 15) through the piping 108 when the valve 84 was shifted to the left.

At the end of the return stroke of the work support 18, a cam 214 on the work support operates a microswitch 216 which is attached to the bed 14 and, as a result, the solenoid S2 is de-energized and the valve 84 returns to its centered position. Thus, there is completed a normal cycle of operation of the machine.

The machine includes provision for raising and holding the cutterhead, above its normal retracted position, about 6" above the work support, for purposes of facilitating sharpening or replacing the teeth of the cutter 28. After the cutter motor has been stopped, as will be explained below, by depressing a stop switch 218 (FIG. 1), the operator draws forwardly a handle 220 (FIGS. 6 and 1) causing the retraction of the shoulder 58 (FIG. 4) on the lever 60 from the post 38 and then depresses another switch 222 (FIG. 1) which causes the solenoid S2 to be energized, the valve 84 to be set to the left and fluid pressure to be delivered again to the bottom of the cylinder 42. As soon as the cutter head rises far enough to bring the shoulder 70 (FIG. 4) on the post above the hook 68 on the lever 60, the switch 222 and the handle 220 are released and the shoulder 70 settles upon the hook 68, the cutterhead now being suspended in its highest position.

Between the handle 220 and the lever 60 are connections including the above-mentioned link 64 (FIG. 6)

and a lever 224 which is pivoted at 226 upon the bed 14, is connected at one end to the link 64 and carries at its other end the handle 220. A spring 228, stretched between the lever 224 and a bracket 230 which is fixed to the bed 14, biases the lever counterclockwise whereby the lower end of the lever 60 is urged into contact with the post 38. The lever 60 is normally locked in its operative position during the operation of the cutter by a bar 232 which is pivoted at 234 upon the bracket 230 and is provided with a notch 236 which is adapted to receive the left-hand end of the lever 224, whereby movement of the latter is prevented unless the bar 232 is lowered away from the lever. The bar 232 is held in operative relation to the lever 224 by a spring 238 which is stretched between the bar and the bed 14. A solenoid S3, which is connected by a link 242 to the bar 232, is provided for lowering the bar away from the lever 224, but only after the cutter motor has been stopped, as will be described below.

The cutter motor 31 is started by depressing the switch 35 (FIG. 1) which causes current to pass to the motor through a reversing contactor (not shown), the motor being driven normally in a counterclockwise direction as viewed from above. The motor shaft 30 (FIGS. 2 and 3) has secured upon its upper end portion a disc 246 on which are pivoted two pawls 248, 248. A light spring 250 is stretched between one end of each pawl and the disc 246 and the other ends of the pawls are thus urged toward teeth 252 on a ring 254. The ring is mounted for limited rotation within a member 256 which is fixed upon the cutterhead 32, the ring being biased in a counterclockwise direction by two springs 258, 258 each of which is stretched between a pin 260 on the ring and another pin 262 on the member 256. The ring 254 has secured on it a block 264 which is normally held against a stop face 266 on the member 256 by the springs 258, 258. When the cutter motor is started, the pawls 248 are swung by centrifugal action away from the teeth 252 and so remain until the stop switch 218 (FIG. 1) is pressed by the operator which causes the above-mentioned reversing contactor to reverse the flow of current through the motor whereby the motor is quickly stopped. As the cutter motor slows down, the above-mentioned pawls 248 are moved by the springs 250 into engagement with the teeth 252 and, upon reversal of the direction of rotation of the cutter the ring 254 is driven by the pawls in a clockwise direction against the resistance of the springs 258. At this time, a cam piece 268, fixed upon the ring 254 is brought into engagement with a roll 270 of a microswitch 272, the latter being mounted upon the member 256. Such operation of the microswitch 272 cuts off the supply of current to the cutter motor 31 and energizes the solenoid S3 referred to above.

After clockwise rotation of the cutter has been stopped, the springs 258 return the ring 254 to its original position with the block 264 abutting the stop face 266. Although the cam piece 268 releases the microswitch 272 during this return movement of the ring 264, the solenoid S3 is maintained energized by a relay coil (not shown). When the arm 232 is drawn downwardly by the solenoid S3, a microswitch 274 fixed upon the bracket 230 is operated by the arm to open the circuit for supplying power to the motor 31, thus giving assurance that the cutter 28 cannot be rotated by power during a servicing period.

When it is desired to return the cutterhead 32 to its normal retracted position after it has been serviced, the aforesaid switch 222 is operated to re-energize the solenoid S1 and to cause the valve 84 to again be set so as to supply fluid to the bottom of the cylinder 42. After the cutterhead rises enough to remove the shoulder 70 from the hook 68, the operator draws the handle 220 forwardly, releases the switch 222 and moves the cutterhead and parts associated therewith downwardly until the shoulder 58 on the lever 60 snaps over the post 38 under the influence of the spring 228. The cutter is thus returned to its normal retracted position. The solenoid S3 is de-energized, permitting the bar 232 to be returned into locking relationship with the lever 224 by the spring 238, at the beginning of each cycle of operation of the machine when the switch 86 is operated and, until the motor 31 is again stopped, operation of the handle 220 is positively prevented. The lever 60 and its shoulder 58 are thus locked in their operative positions through the normal operation of the machine.

The illustrated machine comprises holddown means similar to that disclosed in the above-mentioned James et al. patent for holding the sole in the matrix 20 as the sole is presented to the cutter 28. This means comprises a plate 278 which is carried by a leaf spring 280, the latter being mounted upon a cover 282 which is pivoted at 284 upon the cutterhead 32. A roll 286 is mounted upon a plate 279 at its right-hand end, said plate 279 being affixed to the plate 278. To the inside of the cover 282 there is fixed a block 288 carrying a yielding presser member 290 having an arcuate edge closely adjacent to the path of the cutter, this presser member being equivalent to the plate 76 of the James et al. machine. Inside the cutter 28, a plate 294 is yieldingly supported by a leaf spring 296 which is fixed upon the bottom of a member 298, the upper end of which is clamped in the cutterhead 32. Another yielding presser member 300, similar to the presser member 290 and having an arcuate work engaging edge closely adjacent to the teeth of the cutter at its left-hand side, is fixed upon the member 298. When the cutterhead is lowered into its operative position all the work engaging elements of the above-mentioned holddown structure are disposed below the upper surface of the sole in the matrix 20 so that the sole is continuously pressed into the matrix 20 in advance of and within the cutter before and while the sole is operated upon.

The cover 282 is prevented from being swung upwardly when the cutterhead is in its operative position by the engagement of a pin 302 on the cover with a bar 304 which projects upwardly from the bed 14. When the cutterhead is fully raised, the cover 282 may freely be swung upwardly to expose the cutter for servicing because the pin 302 will have been brought above the bar 304.

A brief summary of the operation and use of the machine follows. It will be assumed that the cutterhead 32 is in its normal retracted position, as determined by the engagement of the shoulder 58 (FIG. 4) on the lever 60 with the post 38, and that the work support 18 is in its loading position, as illustrated in FIG. 1. With the cutter motor 31 and the pump P in operation, a sole to be operated upon is placed in the matrix 20 and the switch 86 (FIG. 1) is operated to initiate a cycle of operation of the machine. The work support 18 first approaches the cutterhead at a high speed, of about 11″ per second, the choke valve 96 being fully open. As the heel end of the sole is brought near to the cutterhead, a closing movement is imparted to the choke valve 96 as a result of the engagement of the shoulder 122 on the cam plate 120 with the roll 130. When the lower point of the shoulder 122 reaches the roll, the work support 18 is stopped because of the closure of the choke valve 96, this event occurring when the heel end of the sole will have been brought up to the cutter 28. Simultaneously with the closing of the choke valve 96, the piston 158 in the valve 152 is released by the latch 162 to cause the cutterhead to be lowered into its operative position and, as it approaches this position, the plate 278 (FIG. 2) and roll 286 press the sole into the matrix. Toward the end of the downward movement of the cutterhead the bell crank 182 (FIG. 16) swings the link 140 to the right, allowing the pin 144 to drop into the bottom of the slot 142 in the link under the influence of the spring 116. The choke valve 96 is thus opened slightly and feeding movement of the work support 18 is resumed at a low speed.

As the low point of the shoulder 122 leaves the roll 130, the bar 148 (FIG. 10) moves off the lug 150 on the arm 132, permitting the latter to be biased rearwardly so that a portion of the roll 130 is brought underneath the cam plate 126. At the same time, the roll 130 rises into engagement with the level cam surface 196 of the cam plate 126 as a result of which the choke valve 96 is set to provide a slow feed movement of the work support of about 2″ per second. This rate of feed movement is maintained while the heel portion of the sole is operated upon. The cam plate 126 is so adjusted that as the breast line area of the sole is presented to the cutter the shoulder 198 on the cam plate 126 passes off the roll 130 whereby the latter is allowed to rise into engagement with the cam surface 124 on the cam plate 120. Thus, the choke valve 96 is opened wider and enough to provide a feed movement of about 5″ per second which is maintained throughout the operation of the cutter upon the shank of the sole and most of its forepart.

While the extreme toe portion of the sole is being operated upon, the cam shoulder 200 of the cam plate 202 is presented to the roll 130 causing the choke valve 96 to be closed enough to decellerate the work support to the former speed of 2″ per second, this speed being temporarily maintained, because of the level cam surface 206, as the toe end of the sole is moved past the cutter.

Upon the operation of the microswitch 208 by the finger 207 on the cam plate 202, the work support 18 is stopped and fluid is supplied to the bottom of the cylinder 42 to cause the cutterhead to be raised into its normal retracted position as determined by the engagement of the shoulder 58 on the lever 60 with the post 38. When the upward movement of the cutterhead 32 is arrested, the valve 102 is opened in response to an increase in the fluid pressure applied thereto and fluid is supplied, via the check valve 98, to the left-hand end of the cylinder 22 whereby a return stroke of the work support 18, at a speed of about 15″ per second, is initiated.

As the shoulder 122 on the cam plate 120 moves away from the roll 130, during the return stroke of the work support, the latch 162 returns into locking engagement with the piston 158 and the choke valve 96 is returned to its fully opened position by the spring 116 when the link 140 will have been lowered enough to bring the upper part of its slot 142 to the level of the pin 144. At this time, the spring 147 swings the link 140 to the left until the right-hand end of the slot 142 is engaged by the pin 144 and, with this action, the machine is restored to its normal starting condition.

Having thus described my invention, what I claim as new and desire to secure by Letters Patent of the United States is:

1. In a machine for operating upon shoe parts, a rotary cutter, a matrix for holding a shoe part to be operated upon, a work support carrying said matix and movable to present the shoe part to said cutter crosswise of its rim, drive means for imparting to said support a cycle of opposite feeding and return strokes, and means operated by said work support for controlling said drive means to vary the speed of said feeding stroke.

2. In a machine for operating upon shoe parts, a rotary cutter, a work support for holding a shoe part to be operated upon and movable to present the shoe part to said cutter crosswise of its rim, drive means for imparting to said support a cycle of opposite feeding and return strokes, and means for controlling said drive means first to interrupt said feeding stroke as the shoe part is brought to said cutter and then to cause said drive means to propel said work support at different uniform velocities while the shoe part is presented to said cutter.

3. In a machine for operating upon shoe parts, a rotary cutter, a work support for holding a shoe part to be operated upon and mounted for opposite feeding and return movements directed toward and away from said cutter, said cutter being mounted for movement toward and away from said work support into and out of an operative position, control means acting upon said drive means and operated by said work support during its feeding movement to interrupt said feeding movement as the shoe part is brought up to said cutter, and means operated by said cutter in response to its movement into operative position for operating said control means so as to cause a resumption of the feeding movement of the work support, said control means also being operated by said work support throughout the remainder of its feeding movement to cause said drive means to propel said work support at different uniform velocities.

4. In a machine for operating upon shoe parts, a rotary cutter, a work support for holding a shoe part to be operated upon and movable to present the shoe part to said cutter crosswise of its rim, drive means for imparting to said support a cycle of opposite feeding and return strokes, and means for controlling said drive means to vary the speed of said feeding stroke, said last-mentioned means comprising cams on said work support for causing said drive means to propel said work support at a slow speed as the end portions of the shoe part are presented to the cutter and at a higher speed while the intermediate portion of the shoe part is presented to said cutter.

5. In a machine for operating upon shoe parts, a cutterhead, a work support carrying a matrix for holding a shoe part to be operated upon, fluid operated drive means for imparting to said support a cycle of opposite feeding and return strokes, said cutterhead being movable into and out of an operative position in synchronism with the operation of said support, and means for controlling said drive means including a valve for interrupting said feeding stroke and changing its speed, said controlling means being operated by said cutterhead and said work support successively, first to interrupt said feeding stroke and then to set said valve in different open positions whereby the said feeding stroke is resumed at different speeds.

6. In a machine for operating upon shoe parts, a cutterhead, a work support for holding a shoe part to be operated upon, fluid operated drive means for imparting to said support a cycle of opposite feeding and return strokes, said cutterhead being movable into and out of an operative position in synchronism with the operation of said support, means for controlling said drive means including a valve for interrupting and changing the speed of said feeding stroke, a cam on said work support for operating said controlling means to close said valve as the shoe part is brought up to said cutterhead whereby the feed movement of said support is interrupted, means operated by said cutterhead as it is moved into its operative position for opening said valve to cause a resumption of the feed movement of said support whereby the leading end of the shoe part is presented to the cutterhead, and other cams on said work support, one for further opening said valve while an intermediate portion of the shoe part is operated upon and another for partially closing said valve as the trailing end of the shoe part passes said cutterhead.

7. A machine for operating upon shoe parts comprising a cutter, a work support mounted for alternate feeding and return movements directed toward and away from said cutter, said cutter being movable transversely of the path of said support into and out of an operative position, drive means for moving said cutter into and out of its operative position, and control means operated by said work support for actuating said driving means to cause an advance of said cutter into its operative position at the beginning of the feeding movement of said support, said control means being operated by said support at the end of its feeding movement to reverse said driving means whereby said cutter is retracted from its operative position.

8. A machine for operating upon shoe parts comprising a cutter, a work support for holding a shoe part to be presented to said cutter, driving means for imparting a feeding movement to said support in one direction and an opposite return movement, a second driving means for moving said cutter into and out of an operative position, and control means operated by said support at the beginning of its feeding movement for acting upon both of said driving means to cause said feeding movement to be interrupted and an advancing movement of said cutter to be initiated, said control means being operated by said cutter at the end of its advancing movement to actuate said first mentioned driving means whereby the feeding movement of said support is resumed.

9. A machine for operating upon shoe parts comprising a cutter, a work support, a fluid system comprising a fluid motor for imparting opposite feeding and return movements to said work support, a second fluid motor for imparting opposite advancing and retractive movements to said cutter into and out of operative relation to said work support, a valve for controlling the exhaust of fluid from said first-mentioned motor during said feeding stroke, a second valve for admitting fluid to said second motor, means operated by said support in response to its feeding movement for closing said first-mentioned valve whereby said feeding movement is interrupted and for opening said second valve whereby an advancing movement of said cutter is initiated, and means operated in response to the final advancing movement of said cutter for reopening said first mentioned valve whereby said feeding movement is resumed.

10. A machine for operating upon shoe parts comprising a cutter, a work support for holding a shoe part to be presented to said cutter, a fluid system comprising a fluid motor for imparting opposite feeding and return movements to said work support, a second fluid motor for imparting opposite advancing and retractive movements to said cutter into and out of operative relation to said work support, a valve for controlling exhaust of fluid from said first-mentioned motor during said feeding stroke, a second valve for controlling admission of fluid to said second motor, valve operating mechanism for closing and opening said first-mentioned valve and said second valve respectively, and means on said support for operating said mechanism as the leading end of a shoe part on the support approaches said cutter whereby feeding movement of said support is interrupted and advancing movement of said cutter is initiated.

11. A machine for operating upon shoe parts comprising a cutter, a work support for holding a shoe part to be presented to said cutter, a fluid system comprising a fluid motor for imparting opposite feeding and return movements to said work support, a second fluid motor for imparting opposite advancing and retractive movements to said cutter into and out of operative relation to said work support, a valve for controlling exhaust of fluid from said first-mentioned motor during said feeding stroke, a second valve for controlling admission of fluid to said second motor, means for closing said first-mentioned valve and opening said second valve whereby feeding movement of said support is interrupted and advancing movement of said cutter is initiated, said means comprising a member which is operated in response to movement of said support as the leading end of a shoe part on the support approaches said cutter.

12. A machine for operating upon shoe parts comprising a cutter, a work support for holding a shoe part to be presented to said cutter, a fluid system comprising a fluid motor for imparting opposite feeding and return movements to said work support, a second fluid motor for imparting opposite advancing and retractive movements to said cutter into and out of operative relation to said work support, a valve for controlling exhaust of fluid from said first-mentioned motor during said feeding stroke, a second valve for controlling admission of fluid to said second motor, valve operating mechanism for closing and opening said first-mentioned valve and said second valve respectively, means carried by said support for operating said mechanism as the leading end of a shoe part on the support approaches said cutter, and means operated by the final advancing movement of said cutter for reopening said first-mentioned valve.

13. A machine for operating upon shoe parts comprising a cutter, a work support for holding a shoe part to be presented to said cutter, a fluid system comprising a fluid motor for imparting opposite feeding and return movements to said work support, a second fluid motor for imparting opposite advancing and retractive movements to said cutter into and out of operative relation to said work support, a valve for controlling exhaust of fluid from said first-mentioned motor during said feeding stroke, a second valve for controlling admission of fluid to said second motor, and means operated in response to feeding movement of said support for closing said first-mentioned valve and opening said second valve during the approach of the shoe part to said cutter whereby feeding movement of said support is interrupted and advancing movement of said cutter is initiated.

14. A machine for operating upon shoe parts comprising a cutter, a work support for carrying a shoe part to be presented to said cutter, a fluid system comprising a fluid motor for imparting opposite feeding and return movements to said work support, a second fluid motor for imparting opposite advancing and retractive movements to said cutter into and out of operative relation to said work support, a valve for controlling exhaust of fluid from said first-mentioned motor during said feeding stroke, a second valve for controlling admission of fluid to said second motor, and means for operating said valves in response to feeding movement of said support as a shoe part thereon approaches said cutter, said means comprising a lever, a cam on said support for operating said lever, a pair of links connecting said lever and said valves, and a lost motion connection between said second valve and the link associated therewith for delaying the operation of said second valve.

15. A machine for operating upon shoe parts comprising a cutterhead mounted for advancing and retractive movements into and out of an operative position, a work support mounted for opposite feeding and return movements to present a work piece on said support to said cutterhead and to remove the work piece from said cutterhead, a fluid system comprising a fluid motor for operating said cutterhead, a second fluid motor for operating said support, a supply valve having one setting in which fluid is supplied to said motors so as to impart a feeding movement to said support and an advancing movement to said cutterhead, said valve having a second setting in which fluid is supplied to said motors so as to cause their reversal whereby a return movement is imparted to said support and a retractive movement is imparted to said cutterhead, means operated by said support during its final feeding movement for shifting said supply valve from its first setting into its second setting, and a second valve for delaying the supply of fluid to said work support motor until the retractive movement of said cutterhead is completed.

16. A machine for operating upon shoe parts comprising a cutterhead mounted for advancing and retractive movements into and out of an operative position, a work support mounted for opposite feeding and return movements to present a work piece on said support to said cutterhead and to remove the work piece from said cutterhead, a fluid system comprising a fluid motor for operating said cutterhead, a second fluid motor for operating said support, a valve through which in one setting fluid is directed to said motors so as to impart a feeding movement to said support and an advancing movement to said cutterhead, said valve having a second setting in which fluid is directed to said motors so as to cause their reversal whereby a return movement is imparted to said support and a retractive movement is imparted to said cutterhead, means operated by said support during its final feeding movement for shifting said valve from its first setting into its second setting, and a second valve for normally preventing flow of fluid to said work support motor, said second valve being opened in response to fluid pressure upon the completion of the retractive movement of said cutterhead.

References Cited in the file of this patent

UNITED STATES PATENTS 959,386   Prenzel _____ May 24, 1910